: US006611659B2

United States Patent
Meisiek

(10) Patent No.: US 6,611,659 B2
(45) Date of Patent: Aug. 26, 2003

(54) ELECTRICALLY HEATED AIRCRAFT COMPOSITE FLOOR PANEL

(75) Inventor: Juergen Meisiek, Muensterdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/184,995

(22) Filed: Jun. 28, 2002

(65) Prior Publication Data

US 2002/0168184 A1 Nov. 14, 2002

Related U.S. Application Data

(63) Continuation-in-part of application No. 09/552,638, filed on Apr. 19, 2000, now abandoned.

(30) Foreign Application Priority Data

Apr. 24, 1999 (DE) .......................................... 199 18 736

(51) Int. Cl.[7] .................................................. H05B 3/20
(52) U.S. Cl. ...................... 392/435; 219/213; 244/129.1
(58) Field of Search ................................ 392/435–437, 392/432; 219/213, 546, 548, 544, 530, 540; 244/129.1, 133, 118.5, 118.1, 117 R; 428/116, 118

(56) References Cited

U.S. PATENT DOCUMENTS

| 2,512,875 A | 6/1950 | Reynolds |
| 2,634,361 A | 4/1953 | Reynolds |
| 2,952,761 A | 9/1960 | Smith-Johannsen |
| 3,465,121 A | 9/1969 | Clark |
| 3,697,728 A | 10/1972 | Stirzenbecher |
| 3,961,157 A | 6/1976 | Miller et al. |
| 3,973,103 A | 8/1976 | Tadewald |
| 4,733,057 A | 3/1988 | Stanzel et al. |
| 4,759,964 A | 7/1988 | Fischer et al. |
| 4,973,506 A | 11/1990 | Bauer et al. |
| 5,004,895 A | 4/1991 | Nishino et al. |
| 5,518,796 A | 5/1996 | Tsotsis |
| 5,667,866 A | 9/1997 | Reese, Jr. |

FOREIGN PATENT DOCUMENTS

| CA | 2100548 | | 1/1994 |
| DE | 2208118 | | 8/1973 |
| DE | 2449676 | | 4/1976 |
| DE | 3922465 | | 1/1990 |
| JP | 63-161328 | | 7/1988 |
| JP | 2-61435 | | 3/1990 |
| JP | 4-136630 | | 5/1992 |
| JP | 4-254119 | | 9/1992 |
| JP | 4-264382 | | 9/1992 |
| JP | 8-64351 | * | 3/1996 |
| WO | 01/17850 | | 3/2001 |

* cited by examiner

Primary Examiner—John A. Jeffery
(74) Attorney, Agent, or Firm—W. F. Fasse; W. G. Fasse

(57) ABSTRACT

An aircraft floor heating panel is constructed for mechanical strength and to meet special heating requirements next to a door in an aircraft. The panel has a lightweight core. Each surface of the core is first covered with at least one carbon-fiber reinforced composite layer for protection against deterioration. Each carbon fiber layer in turn is covered by a glass fiber reinforced composite layer for mechanical strength. A foil heater is arranged inside the composite panel coextensive with at least a portion of the panel area. A heat distributing metal plate covers the panel as an upper step-on surface. A heat insulating layer is bonded to the panel opposite the heat distributing metal plate. A triple heat control is provided for an increased safety against fire hazards.

36 Claims, 4 Drawing Sheets

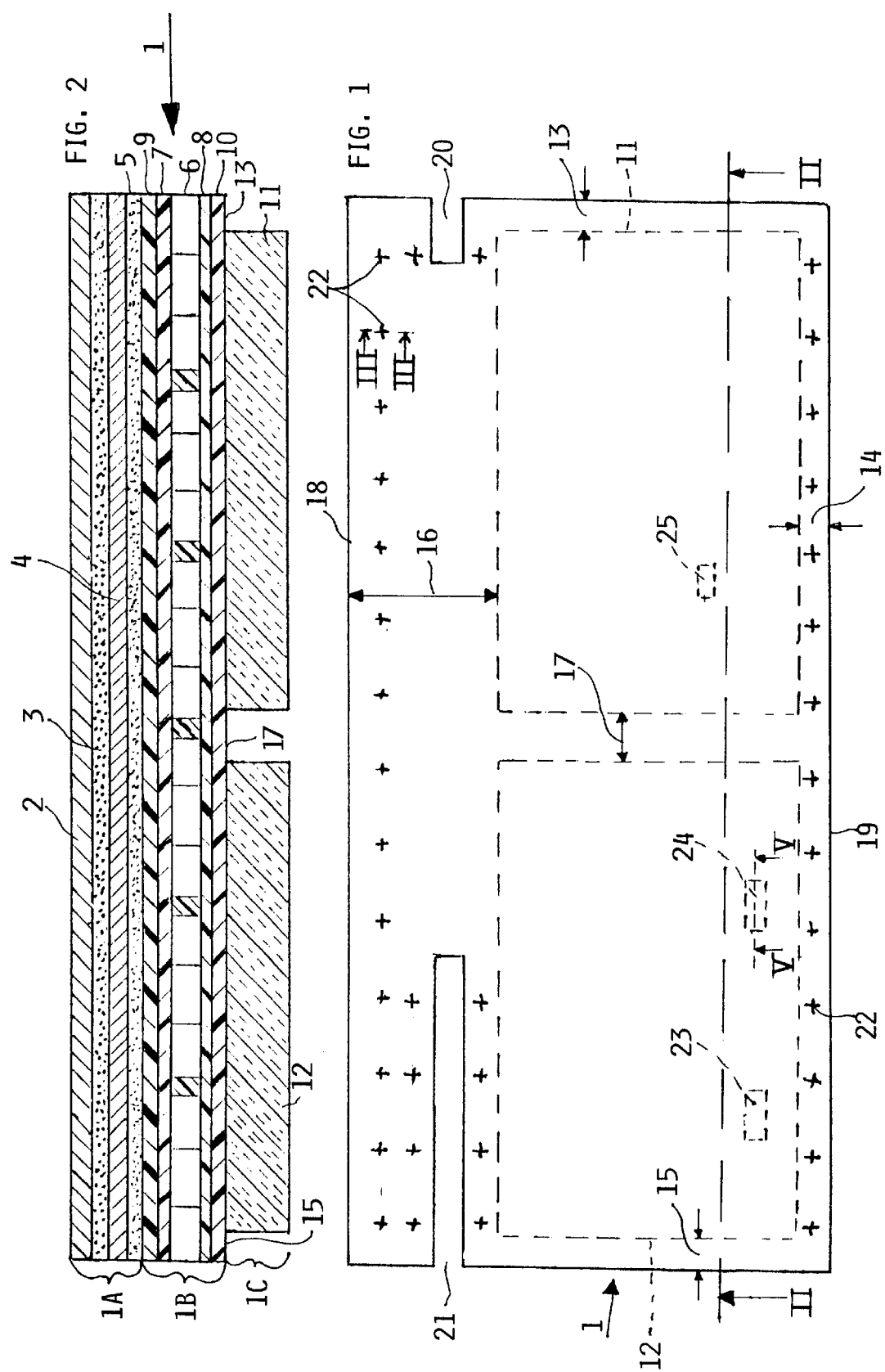

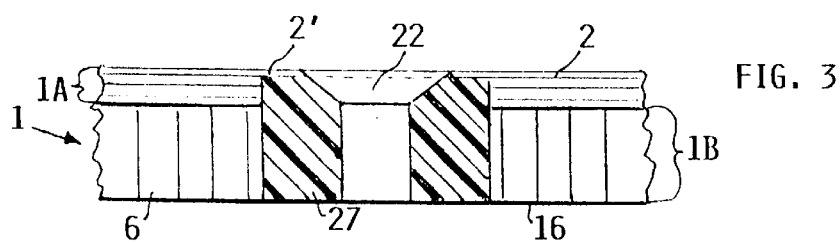
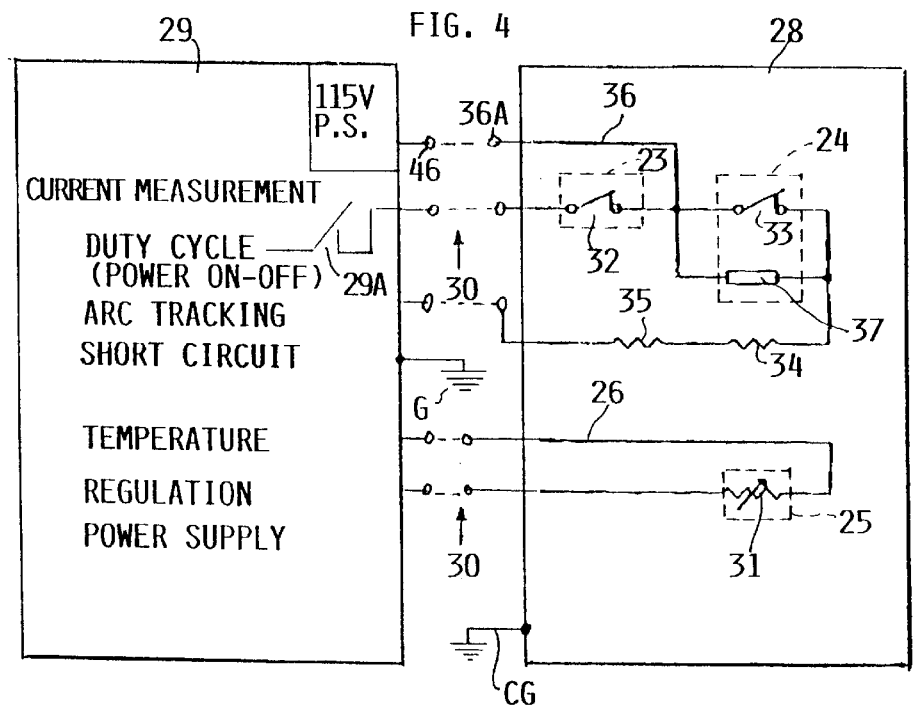
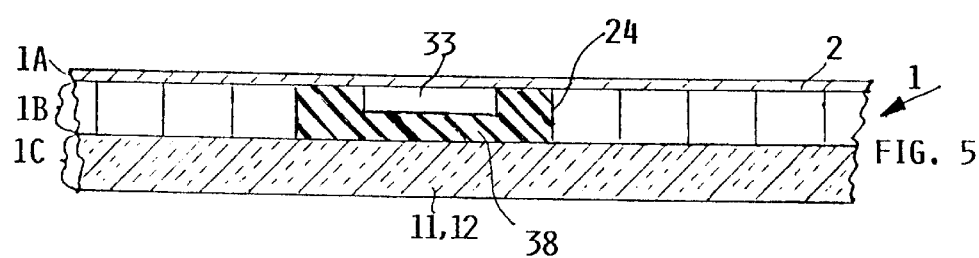
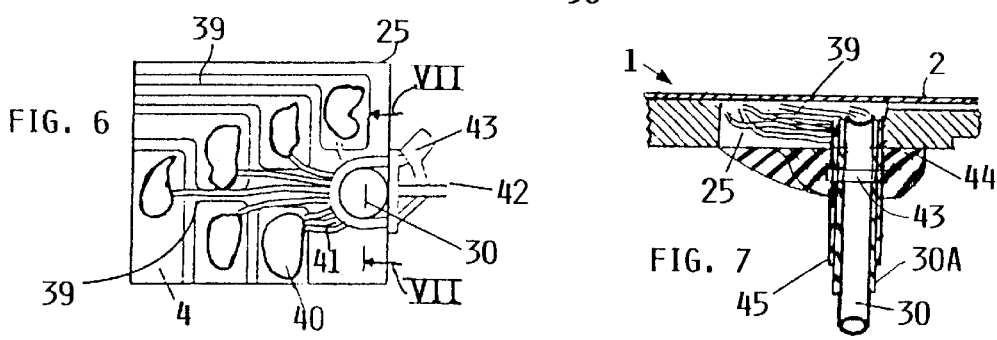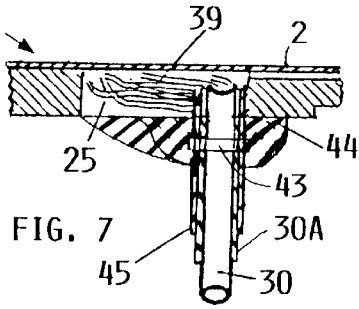

ELECTRICALLY HEATED AIRCRAFT COMPOSITE FLOOR PANEL

CROSS-REFERENCE TO RELATED APPLICATION

This application is a Continuation-In-Part Application of copending application Ser. No. 09/552,638, filed Apr. 19, 2000, now abandoned.

PRIORITY CLAIM

This application is based on and claims the priority under 35 U.S.C. §119 of German Patent Application 199 18 736.3, filed on Apr. 24, 1999, the entire disclosure of which is incorporated herein by reference. This priority is claimed through the copending parent case U.S. Ser. No. 09/552,638, filed on Apr. 19, 2000.

FIELD OF THE INVENTION

The invention relates to electrically heated aircraft floor panels made as composite material panels, particularly for use as a floor panel directly securable to a floor support grid structure of an aircraft. The panel comprises several layers and a lightweight core such as an open-cell or honeycomb core, and at least one step-on cover layer.

BACKGROUND INFORMATION

Conventional composite material panels including an electrical heater are known as sandwich panels and are referred to herein as composite panels which are multi-layer structures including a honeycomb, open-cell, or foam core bonded between upper and lower cover layers that are typically made of glass fiber and/or carbon fiber reinforced materials. The cover layers are bonded or laminated to the core in an autoclave under application of heat and pressure. The dimensions of the core and of the cover layers are selected according to the particular application or use and the strength required of the composite material panel. An example of a honeycomb sandwich structure without an electric heater is shown in the magazine "Flight International", Apr. 17, 1982, pages 988 and 989. Panels with an electric heater are disclosed in U.S. Pat. No. 2,512,875 (Reynolds) and in U.S. Pat. No. 3,697,728 (Stirzenbecher). These conventional panels leave room for improvement especially with regard to strength, durability and particularly safety requirements that must take into account the electrical heating of such composite panels to avoid fire hazards.

U.S. Pat. No. 3,961,157 (Miller et al.) discloses a lightweight electrically heated panel that can be a portable heater or it may be installed as a so-called modesty panel in a desk. The temperature is controlled by a thermostat connected in series with a thermal fuse. The thermostat and fuse are inserted in a honeycomb core where both are thermally insulated from the electrical heater. Such a structure cannot meet the strength and safety requirement of an aircraft floor panel.

Composite panels, particularly those with a honeycomb or open-cell core have a low weight and high strength and, for this reason, are particularly suitable as construction material for aircraft. Honeycomb sandwich panels are used, for example, as floor panels in aircraft. In a passenger cabin of an aircraft, such floor panels are covered either with a synthetic covering NTF, so-called non-textile floor covering, or with carpeting. In both instances, the panel causes fire safety problems due to the electrical heating.

The floor area near the aircraft door in a passenger cabin has to be heated during flight because the temperature on the outer skin of an aircraft flying at high altitudes can be as low as −55° C. Therefore, the temperature in the floor area near the door can sink to as low as −15° C., particularly after prolonged flight durations of approximately 5 hours or more at these altitudes. Passive measures to protect the door area against the cold, such as providing an insulated floor covering, are generally not adequate at such low temperatures and heat energy must be provided to these areas. For this reason, conventional warm air heating systems are used to feed warm air to the floor area near the door. The use of warm air systems in aircraft, however, is inefficient for a number of reasons. Such systems require a substantial electrical power supply and an alternating airflow from the air conditioning system. These systems also increase the weight of the aircraft and may cause discomfort among passengers and/or flight personnel because of uneven surface temperatures or drafty dry air circulation. Contamination of the air vents and the danger of blocking air vents by baggage are further disadvantages of warm air heating systems.

An alternative solution to the problem of providing heat in the floor area near the door in an aircraft passenger cabin is to screw separately heatable metal floor panels onto the conventional floor panels. This solution also has the disadvantages of adding weight to the aircraft, as well as increasing the high energy consumption. Heatable metal floor panels add approximately 60 kg per panel to the weight of the aircraft which must be avoided.

German Patent Publication DE-02 39 22 465 A1 discloses a panel component in which an electric heating device is embedded. The known panel is preferably constructed as a plywood panel and is typically used in housing construction and particularly in household areas such as the kitchen. The heating device is constructed of a plurality of tape-shaped electrodes and a radiant heater formed as a layer of synthetic material. Carbon particle mixtures are used as the radiant heater layer. Because of the combustion properties of such carbon particle mixtures, carbon particle heaters cannot be used in the passenger areas of an aircraft unless extensive safety measures are taken which add to the weight and cost of the aircraft. Thus, for reasons of safety and economy, such conventional systems are generally unsuitable for use in commercial passenger aircraft. These considerations also apply to the disclosures of the following Japanese Patent Publications: JP 4-136630, JP 2-61435, and JP 63-161328. Each of these publications relates to building construction and does not meet aircraft safety requirements.

OBJECTS OF THE INVENTION

In view of the above it is the aim of the invention to achieve the following objects singly or in combination:

to provide a composite electrically heated aircraft floor panel that can be used instead of a conventional unheated floor panel in the area next to and alongside an aircraft door in a passenger cabin or in other cold spaces in the floor area of an aircraft, in order to achieve homogenous surface temperatures at the floor level, preferably in the range +20° C. to +35° C. under normal operating conditions;

to construct such a panel so that it achieves a reduction in weight and in energy consumption, compared to conventional aircraft floor heating solutions;

to construct such a panel that it simultaneously satisfies the mechanical strength of a step-on floor panel and the electrical safety requirements that must be met by aircraft floor panels particularly against fire hazards;

to achieve a uniform floor heat distribution by radiation that emanates in a controlled manner per surface area unit over the surface area of the panel so that for example panel areas directly next to the door radiate more heat than areas of the same panel further away from the door;

to avoid generating uncomfortable air drafts in the door areas of a passenger aircraft; and to provide the present panels with surface area configurations that conform to the floor layout.

SUMMARY OF THE INVENTION

An aircraft floor heating panel according to the invention comprises a heat resistant fiber composite core structure for providing the structural strength of an aircraft floor panel, an outer first section including an electrical heater preferably a foil heater and a heat distributing metal plate forming a walk-on surface, a first adhesive bond between the electrical heater such as a foil heater and the heat distributing metal plate, a second adhesive bond between the foil heater and the fiber composite core structure, an outer second section including one or more heat insulating pads bonded to the fiber composite core structure opposite the outer first section so that the fiber composite core structure is sandwiched between the outer first and second sections. One or several cut-outs are provided in the composite core structure below the heat distributing metal plate. A PTC temperature sensor is embedded in at least one cut-out in heat sensing contact or proximity with the heat distributing metal plate. The positive temperature coefficient sensor is electrically connected to a control and power supply unit in the aircraft for switching a power supply on and off under normal operating temperatures. Redundant fire hazard protection components are electrically connected in series with the electrical foil heater for interrupting an electrical power supply to the electrical foil heater thereby overriding any control by the temperature sensor in response to temperatures exceeding normal operating temperatures.

The redundant fire hazard preventing components preferably comprise a first thermostatic switch embedded in a preferably separate cut-out in the fiber composite core structure and responsive to a first cut-off temperature, a second thermostatic switch embedded in another separate cut-out and responsive to a second cut-off temperature higher than the first cut-off temperature, and an electrical circuit connecting the electrical foil heater, the first thermostatic switch and the second thermostatic switch in series with each other and to an electric power supply which is switched on and off in response to the above mentioned sensor. The second thermostatic switch opens the electrical power supply circuit when the first thermostatic switch failed to open the electrical power supply circuit and the second higher cut-off temperature is reached. Preferably, each thermostatic switch is embedded with moisture sealing, heat resistant potting material in its own recess in the fiber composite core structure, but in heat sensing proximity of the heat distributing metal plate. The second thermostatic switch may be constructed as a resettable thermostatic fuse.

According to the invention there is further provided an aircraft comprising a fuselage, at least one door in the fuselage, a floor support structure in the fuselage, at least one step-on floor heating panel secured to the floor support structure next to the door, an electrical heater such as a foil heater in the floor heating panel, a heat distributing metal plate forming a step-on surface as an integral part of the floor heating panel opposite the floor support structure, at least one temperature sensor in the floor heating panel positioned in a location away from the door for sensing a normal floor panel temperature, particularly the hottest panel temperature compared to the cabin temperature in the floor area near the door and with reference to the temperature conditions below the floor heating panel. The temperature sensor in the floor heating panel takes these different temperatures into account. Therefore, the temperature sensor is arranged away from the door sill which could still have a temperature that is lower than the normal operating temperature or passenger comfort temperature of about 25° C. to 35° C. in the door area. A power supply circuit is Controlled by the at least one temperature sensor in response to a temperature control signal generated by the at least One temperature sensor. The control signal causes a power supply switch to repeatedly open and close for maintaining a desired temperature which may be selected by adjusting the temperature sensor respectively. The temperature sensor cooperates or rather is overridden by a fire hazard protection device which preferably comprises a first and a second thermostatic switch connected in series with each other in the power supply circuit. The first and second thermostatic switches are positioned in the panel core structure in heat transfer contact or proximity with the heat distribution metal plate away from the door, wherein the first thermostatic switch responds to a first temperature in a first preferably adjustable range and the second thermostatic switch responds to a second temperature higher than the first temperature. Preferably, the second temperature or its range is also adjustable.

Preferably, for maintenance use a monitoring circuit is connected to the second thermostatic switch to make certain that the second thermostatic switch remains open until normal operating temperatures have been restored and a reset signal is supplied to the second thermostatic switch.

A particular advantage of the composite panel according to the invention is a substantial reduction in weight relative to conventional floor heater solutions. This is an essential feature of the invention, since weight reduction is a continuous concern in aircraft construction. The composite panel according to the invention uniformly heats the cold areas of the floor next to a door in an aircraft passenger cabin by providing an even distribution of heat without causing uncomfortably warm or drafty air flows.

The present film or foil heater is integrated into the composite panel by adhesively bonding flat foil heater elements directly between a heat distributing metal plate and a laminated lightweight heat resistant core structure for example by epoxy and/or acrylic adhesives, whereby the flat heater is sandwiched between the metal plate and the laminated core structure and the adhesive forms an electrical insulation between the electrical heater and the heat distributing metal plates. The laminated structure of the panel is constructed to provide the mechanical strength required for aircraft step-on floor panels. The heater and its controls are constructed to meet the stringent safety requirements applicable to electrical systems in an aircraft to avoid a fire in the aircraft.

The mechanical strength providing laminated structure comprises a lightweight honeycomb core sandwiched between two inner core protecting layers made of carbon fiber reinforced composite material. The core and CFC layers in turn are sandwiched between two mechanical strength providing glass fiber reinforced composite layers (GFC). This sequence of layers is necessary for obtaining the required protection of the lightweight core by the CFC-layers against deterioration and for obtaining the required mechanical core strength by the GFC-layers bonded to the core through the CFC-layers. The GFC-layers further function as electrical insulating layers to prevent any electrical contact between the CFC-layers and, for example, the heat distributing metal plate or any other metal contact with the floor structure. Further, the CFK layers are electrically grounded for avoiding so-called arc tracking.

The matrix material of the CFC- and GFC-layers is, for example a phenol-formaldehyde resin (PF). The heat distributing metal plate is preferably made of aluminum which provides a step-on surface and simultaneously a uniform even heat distribution over the surface area of the composite panel. The metal plate also protects the panel, particularly the heater against damage and mechanical stresses.

The above mentioned positive temperature coefficient (PTC) sensor in combination with the two thermostatic switches of the present composite panel provides a redundant safety protection against fire hazards. By providing temperature control signals to a control unit the PTC sensor maintains the cabin temperature next to the door in a normal range. At least one, preferably two separate safety thermostatic switches responsive to different temperatures and/or to an excess current, e.g. a short-circuit current, operate independently of the PTC sensor and override the PCT sensor if it fails to prevent an unusual temperature rise. The two safety switches are connected in series with each other in the power supply circuit of the floor panel electric foil heater. For safety reasons it is critical, that the safety switches work independently of each other and independently of the PTC sensor and that the safety switch responsive to the higher temperature or to an excess current can be independently monitored and controlled in its operation. These redundant temperature and/or current controls regulate the temperature of the floor panel to prevent overheating of the panel and thus to prevent a fire hazard.

At least one switch of the safety switches acts as an excess current control by opening the heater power supply circuit in response to an excess current which is also monitored in the power supply and control unit. A resettable fuse for example can switch off the heater power supply in response to a short-circuit. In case of damage to the panel the control unit switches off the power supply to the electric foil heater of the panel.

The position of the sensor and switches in the present composite panel is critical for obtaining a safe temperature control and for obtaining different heat outputs in different panel areas. For this purpose several cut-outs are preferably positioned in the composite panel for mounting the sensor and safety switches and respective conductors and terminals in the panel away from the aircraft door where the highest heat concentration per surface area unit is expected since the area closest to the door is the coldest. These cut-outs are covered with a watertight seal, preferably epoxy resin or similar potting material, to protect the panel, sensor, and switches against the ingress of moisture. It is critical that the PTC sensor and the thermostatic switches are positioned in heat sensing proximity of the heat distributing metal plate to assure that critical temperatures are positively controlled to maintain the required safety. A resettable fuse or over temperature switch responsive to an excess current may be positioned where it is most practical for the panel construction or production.

In a further embodiment of the composite panel according to the invention, an insulating layer, preferably of several synthetic foam pads, is positioned and bonded to the laminated core sandwich structure opposite the heat distributing metal plate. The insulating layer which is adhesively bonded to the bottom surface of the core sandwich structure has an areal or surface configuration which is smaller than the surface or a real configuration of the composite panel, whereby the panel is provided with mounting margins or rims and gaps for securing the panel to a floor support structure particularly a support grid structure. This insulating layer fits between the stringers and joists of the floor support structure, thereby reducing heat loss from the floor panel and thus reducing the amount of energy required for heating the floor next to and alongside an aircraft door.

BRIEF DESCRIPTION OF THE DRAWINGS

In order that the invention may be clearly understood, it will now be described by way of example, with reference to the accompanying drawings, wherein:

FIG. 1 is a top plan view of an electrically heated floor panel according to the invention for an aircraft cabin floor, wherein a heat insulating layer has a pattern that fits into a floor support grid structure;

FIG. 2 is a sectional view along section plane II—II in FIG. 1 showing that heat insulating pads of the heat insulating layer conform to the cabin floor support grid structure of an aircraft;

FIG. 3 is a sectional view along section plane III—III in FIG. 1 illustrating on an enlarged scale a mounting hole through a reinforced mounting rim or margin free of heat insulation material of the present floor panel;

FIG. 4 shows an electrical circuit arrangement for heating and controlling the heating temperature of an electrical foil heater forming part of the present aircraft cabin floor panel;

FIG. 5 is a sectional view along section plane V—V in FIG. 1 showing a cut-out in the composite core structure with, for example, a safety switch embedded in the cut-out with potting material and in a heat sensing position relative to a heat distributing metal plate that is part of the present aircraft floor heating panel;

FIG. 6 is a view perpendicularly to the surface of FIG. 1 into a conductor exit cut-out in the present aircraft floor heating panel with electrical conductor terminals and a connector cable end;

FIG. 7 is a sectional view along section line VII—VII in FIG. 6 showing a conductor cable exit out of the present aircraft floor heating panel;

Figure 8:
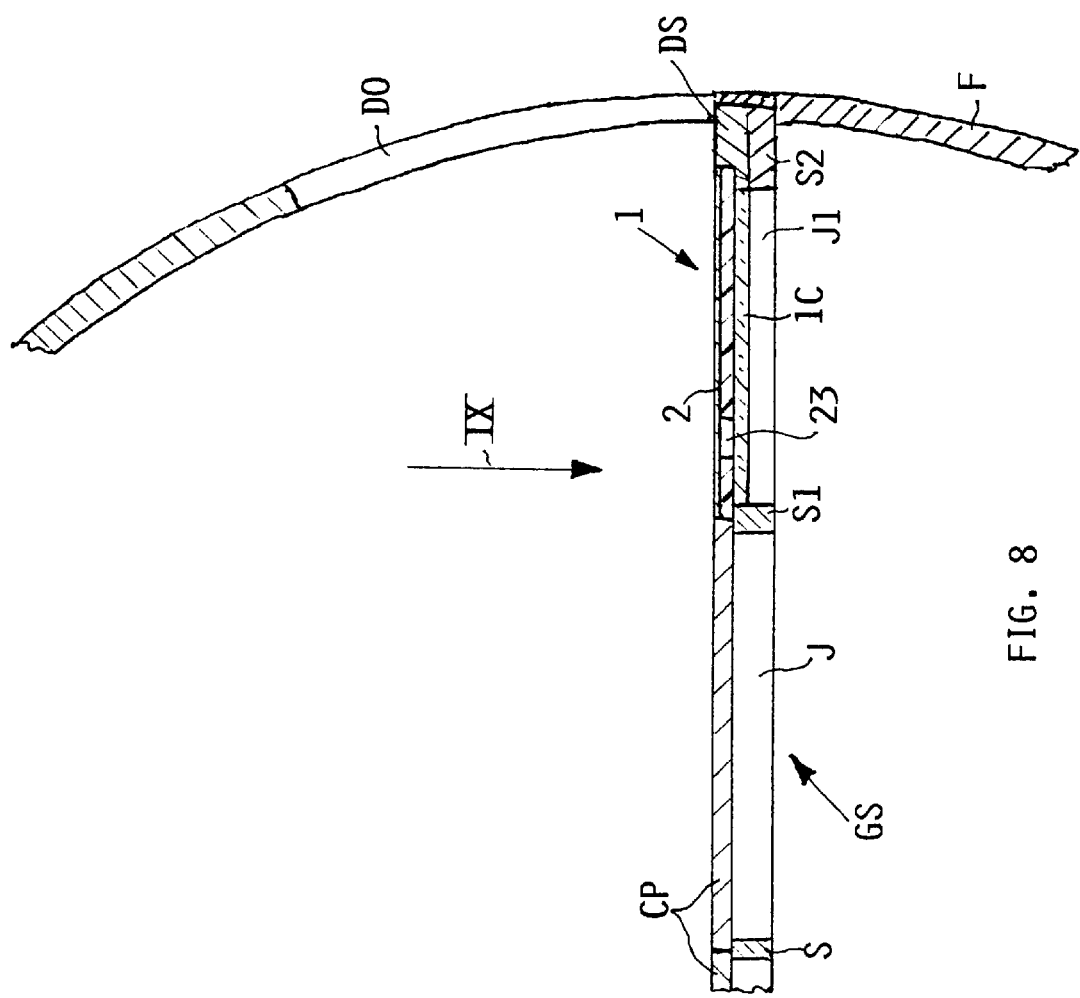
FIG. 8 is a broken away sectional view through an aircraft fuselage and floor support grid structure with a floor heating panel according to the invention installed on the support grid structure next to and alongside a door opening in the aircraft fuselage.

DETAILED DESCRIPTION OF PREFERRED EXAMPLE EMBODIMENTS AND OF THE BEST MODE OF THE INVENTION

FIGS. 1 and 2 show an example of the present panel 1. FIG. 1 is a top plan view of an electrically heated aircraft composite floor panel 1 according to the invention. FIG. 2 shows in its sectional view along section line II—II in FIG. 1 the structural details of the present panel. The panel 1 has a heater and step on section 1A, a mechanical strength providing fiber composite core section 1B and a heat insulating section 1C with the core section 1B sandwiched between sections 1A and 1C. The heater and step-on section 1A of the panel 1 comprises a heat distribution metal plate 2 preferably of aluminum which covers the upper surface of the composite panel 1 and provides protection against mechanical stress. The metal plate 2 also assures an even heat distribution over the surface area of the panel 1. A relatively thin, approximately 0.5 mm thick, surface treated metal plate can serve for this heat distribution purpose. The plate 2 made of aluminum is capable of a rapid heat transfer and a homogeneous heat radiation from the panel. A bonding layer 3, for example an acrylic bonding layer 3 adhesively secures a flat heater such as a foil heater 4 to the metal plate 2. The adhesive layer 3 functions simultaneously as an electric insulator between the cover metal plate 2 and the foil heater 4. An additional electrically insulating layer may be provided between the metal plate 2 and the foil heater 4. A further adhesive layer 5 bonds the section 1A to the mechanical strength providing core section 1B.

The lightweight, heat resistant mechanical strength providing core section 1B comprises a central lightweight core such as a honeycomb core 6 sandwiched between two carbon fiber composite (CFC) layers 7 and 8 which protect the core 6 against deterioration. The core members 6, 7, and 8 are in turn sandwiched between two glass fiber composite (GFC) layers 9 and 10 which provide additional mechanical strength. The GFC-layers 9, 10 are also electrical insulators to prevent any electrical contact between the CFC-layers 7, 8 and, for example, the heater 4 and/or the metal plate 2 or any other metal contact in the floor structure. The CFC-layers are electrically grounded for further protection by avoiding arc-tracking. The carbon fiber composite layers 7 and 8 and the glass fiber composite layers 9 and 10 were so-called "prepregs" prior to their stacking with the core 6 and curing. Prepregs are not yet cured and include fibers embedded in curable resins such as epoxy resins, for example phenol formaldehyde resins.

Section 1C comprises two heat insulating pads 11 and 12 facing downwardly to reduce heat loss into an unheated aircraft space below a cabin floor. The pads 11 and 12 are preferably made of heat insulating synthetic foam. These pads 11 and 12 are adhesively bonded to the core section 1B and the surface area of the pads 11 and 12 facing the core section 1B may be heat reflecting.

The pads 11 and 12 each have an a real or surface configuration that is smaller than the area or surface configuration of the composite panel sections 1A and 1B. Sections 1A and 1B are congruent to each other and larger than the surface areas of the pads 11 and 12 to provide mounting margins or rims 13, 14, 15 and 16. The rims face downwardly and are free of heat insulation for providing support surfaces of the panel 1. The panel 1 rests with these margins or rims 13, 14, 15 and 16 on a support floor grid structure. The two pads 11 and 12 are also spaced from each other in the longitudinal direction of the panel to provide a further support area 17, to be described in more detail below with reference to FIG. 8.

Referring again to FIG. 1, the panel 1 has a door facing edge 18 and an edge 19 opposite the door facing edge 18. The margin or rim 16 next to the door facing edge 18 has a substantially larger support surface area than the margins or rims 13, 14 and 15 in order to support the margin 16 on the floor support grid structure next to and alongside a door sill DS shown in FIG. 8. The downwardly facing heat insulating pads 11 and 12 do not interfere with the mounting of the floor panel 1 to the floor support grid structure GS as shown in FIG. 8. The panel 1 is further provided with through slots 20 and 21 which are also free of heat insulating material. The slots 20, 21 are so positioned in the panel 1 that seating support rails forming part of the cabin floor structure, will not interfere with the proper positioning of the panel 1 alongside a cabin door. Thus, the panel 1 can be efficiently placed into a properly aligned position so that screw holes 22 in the margins of the panel are properly aligned with respective holes in the floor support grid structure GS for securing the panel to the grid structure.

FIG. 1 shows by dashed lines a plurality of cut-outs 23, 24 and 25 positioned in the panel in such locations that the above mentioned thermostatic cut-off members such as switches 32, 33, or a resettable fuse, or an over temperature switch, or a temperature sensor 31 to be described in more detail below with reference to FIG. 4, can be installed in a respective cut-out of these cut-outs in heat transfer contact or proximity with the metal plate 2. Once a thermostatic switch, resettable fuse, over temperature switch or sensor is installed in a respective cut-out 23, 24, 25 these cut-outs are filled with a potting material such as epoxy resin or the like for preventing the entry of moisture into the panel. The temperature sensor 31 is inserted into the cut-out 25 and sealed by a potting material in heat transfer contact or proximity with the metal plate 2 as shown in FIG. 5. An electrical conductor connection is provided in the respective cut-outs as will be described in more detail with reference to FIGS. 6 and 7. It is important that the cut-outs 23, 24, 25 are so positioned in the panel 1 that the thermostatic switches 32, 33 and the temperature sensor 31 will be located in positions where the respective maximum panel operating temperature to which the switch or sensors is responsive will develop, namely away from the door edge 18. The cooling effect of the area next to the door may falsify the true temperatures so that an overheating might not be prevented. Further, it is important that the thermostatic switches in the cut-outs 23, 24 and the sensor 31 in the cut-out 25 are positioned in immediate heat transfer proximity or contact with the electrical foil heater 4.

FIG. 3 illustrates on an enlarged scale a screw hole 22 in a sectional view. The screw hole 22 passes through both sections 1A and 1B of the panel and is surrounded by a reinforcement 27 such as an insert of fiber composite material, preferably glass fiber composite material that is bonded into an opening passing through the panel 1. However, at the top the insert or reinforcement 27 is covered by the heat distributing metal plate 2 as shown at 2'. However, the head of a screw fitting into the screw hole 22 is accessible through a respective hole in the metal plate 2. The reinforcing insert 27 rests on a floor grid member such as a stringer or joist provided with threaded holes as will be described below with reference to FIGS. 8 and 9.

FIG. 4 illustrates the circuit arrangement 28 for controlling the temperature, the heat generation, and the heat distribution in a panel according to the invention. The circuit 28 comprises an electronic control unit 29 that performs the functions indicated by the labels in the box representing the control unit 29. The circuit 28 and the control unit 29 are interconnected by a cable 30 to be described in more detail below with reference to FIGS. 6, 7 and 10. The heating circuit 28 according to the invention as shown in FIG. 4 comprises a PTC-sensor 31 embedded by a potting mass in the cut-out 25 of the panel 1. The PTC-sensor 31 with its positive temperature coefficient measures the current temperature of the metal plate 2. The measured current temperature signal is transmitted through a conductor 26 to the electronic control unit 29 which generates a power supply control signal responsive to the temperature signal. Under normal operating conditions the sensor 31 controls the temperature of the panel 1. The temperature regulation by the control unit 29 in response to the sensor 31 keeps the temperature of the electrical foil heater 4 at a set value that can be adjusted. For example, an ON-OFF power supply switch 29A in the control unit 29 switches the power ON at 42° C. and OFF at 45° C. in response to the signal from the sensor 31 to assure that the metal plate 2 has the required, set surface temperature for example, within the range of +20° C. to +60° C., ±5° K., preferably within the range of 20° C. to +35° C. The conductor 26 is preferably a printed circuit lead or conductor on the foil of the foil heater 4.

Figure 10:
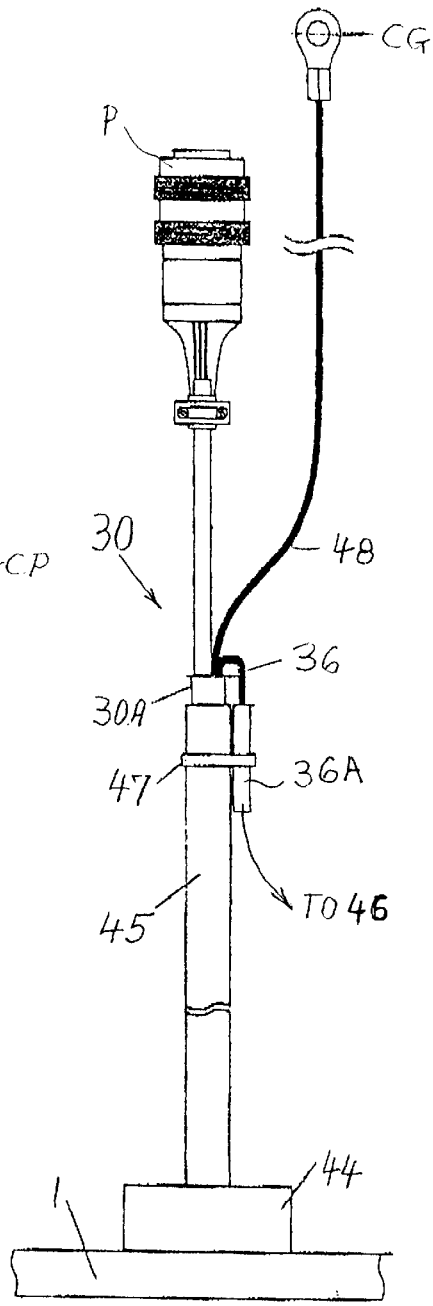
FIG. 10 is an enlarged view of the conductor cable exit also shown in FIG. 7 illustrating separate grounding and monitoring conductors.

The operation of the temperature control sensor 31 is independent of the operation of two series connected thermostatic switches 32 and 33 forming a redundant safety device for preventing fire hazards. The thermostatic switch 32 is embedded in the cut-out 23 and the thermostatic switch 33 is embedded in the cut-out 24. The switches 32, 33 are connected in series with two foil heater resistances 34 and 35. This series circuit is connected through respective conductors of the cable 30 to the control unit 29 for the required power supply through the switch 29A. The foil heater 4 is also connected to ground, specifically to case ground CG. The cable 30 is provided with a conventional plug-in connector P as seen in FIG. 10 which will be described in more detail below.

The resistors 34 and 35 are selected to provide different heat outputs per surface area unit in different areas of the panel 1. It has been found that a larger heat output per surface area unit is required in the margin areas or panel sections 13, 14, 15, 16, and 17 where there is no heat insulation due to a floor supporting grid structure GS shown in FIG. 8. These areas are referred to as high power or high heat output zones. On the other hand, a lower heat output per surface area unit is sufficient in the areas or sections protected by the heat insulating pads 11 and 12 of the panel. These insulated areas are referred to as lower power or lower heat output zones compared to the high heat output zones. Thus, according to the invention the heat output is larger particularly along the margin 16 extending alongside the door opening than in other areas of the panel. As shown in FIG. 1, the cut-outs 23, 24, 25 for the thermostatic switches 32, 33 and for the sensor 31, respectively, are positioned in the lower heat output zones protected by the heat insulating pads 11, 12 which are congruent with the lower heat output zones while the margin areas 13, 14, 15, 16, 17 are congruent with the high heat output zones of the panel.

Referring further to FIG. 4, the two normally thermostatic switches 32 and 33 operate independently of the temperature control by the PTC-sensor 31 to prevent overheating in case the temperature control by the PTC-sensor 31 and/or the control unit 29 should fail and the power remains on. Each of the switches 32 and 33 has its own thermostat or each is a bi-metal switch. For example switch 32 opens the circuit in response to a temperature of 60° C. ±5° K. Should the switch 32 fail, the switch 33 will open in response to a temperature of, for example 80° C. ±5° K. This switch is very important because it must assure that temperatures reaching 80° will positively shut-off any further power supply to the heating panel 1. An excess current responsive fuse not shown may be additionally connected in series with the switches 32, 33 and the resistors 34 and 35. To assure the required safety, the switch 33 must remain open once it has opened and can be closed again only by an intended action of a crew member for again switching on the power supply for the heater.

For maintenance and operability checking on the ground a monitoring circuit or wire 36 according to the invention permits separately connecting the switch 33 to a separate 115V power supply PS that is shown merely for convenience of illustration in the control unit 29. A heating resistor 37 is connected in parallel to the switch 33. The heating resistor 37 is positioned in heat transfer proximity to the switch 33 for heating the switch 33 to keep the switch 33 open when the switch 32 remains permanently closed, for example due to a short circuit or other failure of the switch 32 or a failure of the heating circuit with the resistors 34 and 35. Only when the monitoring power source PS connected with its output 46 to the monitoring conductor 36 through a so-called jiffy connector 36A, is switched off and the resistor 37 cools down can the switch 33 be closed again or reset, provided that the panel temperature has decreased to a safe level. In an emergency the switch 33 is kept open by the heat from the resistor 37.

The circuit arrangement 28 has a so-called case grounding CG which is connected to the heat distribution metal plate 2 and/or to the carbon fiber composite layers 7 and 8 shown in FIG. 2. The foil heater is also grounded, however, the electrical resistance heaters 34 and 35 receive their power from the control unit 29 which in turn is also grounded at G.

FIG. 5 is a sectional view through a cut-out in the panel 1 along section plane V—V in FIG. 1. The cut-out 24 is shown as an example, but the illustration is representative of all cut-outs 23, 24 and 25, for the switches 32 and 33 and the sensor 31, respectively. Each of the sensor 31 and the switches 32 and 33 are embedded in epoxy or similar moisture-tight bedding or potting material 38.

FIGS. 6, 7 and 10 show a cable bundle 30 with its one end secured to the panel 1 and a connector plug P secured to the other end of the cable bundle 30. Conductors 39, for example in the form of printed circuit conductors on the surface of the heater 4 lead to terminal pads 40 which in turn are connected to conductors 41 bunched into the cable 30. The cable bundle 30 is secured to a cable mounting bracket 42. The bracket 42 is in turn attached to the panel 1. The end of the cable is tied to the bracket 42 by a cable tie 43. After the electrical connections of the conductor ends 41 to the pads 40 have been made, for example by soldering, the recess 25 is also filled with potting material 44 to assure a moisture-tight seal. The cable 30 with its insulation 30A is enclosed at its end at the panel 1 by a shrink-fit hose 45. FIG. 10 shows that the monitoring conductor 36 for the resistor 37 leads separately to a so-called jiffy connector 36A tied to the cable 30 with a wire tie 47. For maintenance purpose thus, power from a separate power source PS shown in FIG. 4 is readily applied to the resistor 37 by connecting the power output 46 to the jiffy connector 36A.

FIG. 8 shows the electrically heatable floor panel 1 according to the invention installed in the floor of an aircraft. Only a portion of a fuselage wall F is shown. A cabin floor supporting grid structure GS is tied into the body rib structure which also supports a door sill DS at the bottom of the door opening DO in the fuselage F. The grid structure GS is formed by stringers S, S1, S2 extending in the longitudinal aircraft direction, and joists J, J1 extending perpendicularly to the length direction. Conventional panels CP are installed on the grid Structure away from the door opening DO. The present panel 1 is screwed to the stringers S1 and S2 by screws passing through screw holes 22 in reinforcements 27 shown in FIG. 3. Section 1C with the heat insulating pads 11 and 12 extends into the spaces in the grid structure between the joists J and the stringers S. The joist J1 extends into the gap 17 seen in FIG. 2 between the two heat insulation pads 11 and 12.

Figure 9:
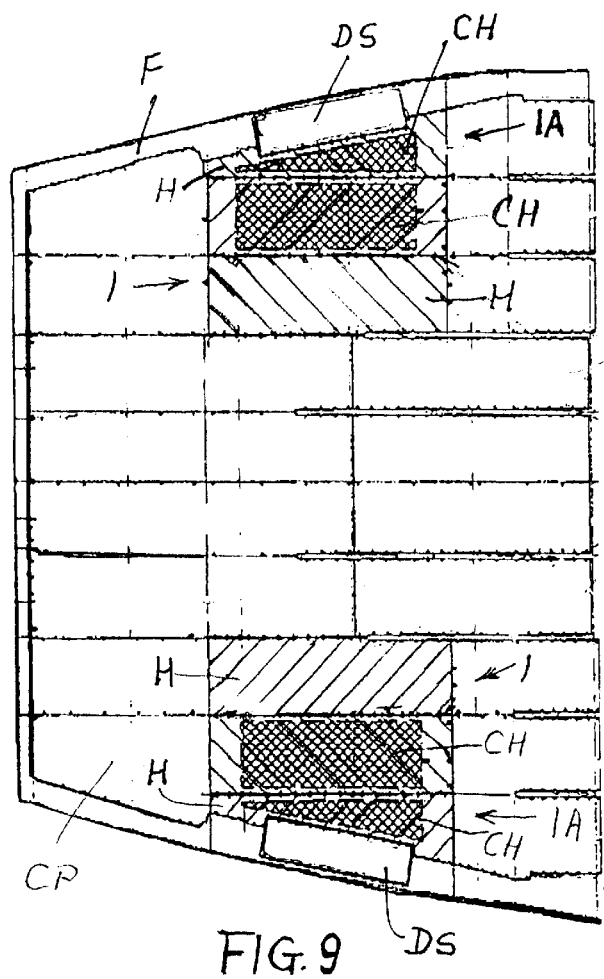
FIG. 9 is a view onto the floor of an aircraft cabin section equipped with floor heating panels according to the invention having different surface area configurations adapted to the floor shape of the cabin.

FIG. 9 shows a plan view of a cabin section as seen in the direction of the arrow IX in FIG. 8 to illustrate the position of floor heating panels 1 and 1A next to the respective door sill DS. The panels 1 have a rectangular a real configuration. The panels 1A have a substantially triangular a real configuration to accommodate the tapering of the fuselage F. The term "substantially" covers triangular shapes with cut-off corners for example. Cross-hatched areas CH designate heated areas of the panels. Hatched areas H designate not heated areas of the panels. The panels 1A may have a higher intensity heat output than the panels 1 because the panels 1A are positioned closer to the door.

The present composite panel 1 is produced by applying heat, preferably in an autoclave under vacuum after the various layers of prepregs, including adhesive and the heat distribution metal plate, are assembled. The manufacturing results, in one step so to speak, in the bonding of all layers and plate simultaneously. The curing and bonding in a vacuum at the proper curing temperatures is advantageous for eliminating air inclusions except for unavoidable remainder air inclusions. The manufacturer of the prepregs provides information regarding the proper curing temperatures. The panel has a total thickness of about 9.5 to 10 mm which is surprising with regard to the mechanical strength provided by such a panel so that it can be used as a step-on floor panel in an aircraft cabin floor. The heat insulating pads 11 and 12 have a thickness of about 10 to 20 mm and these pads can be recessed in the floor supporting grid structure GS due to the margins 13, 14, 15 and 16 free of heat insulation. Further, the pads 11, 12 are spaced from each other to form a gap 17. A joist J fits into the gap 17 when the panel is installed. Insulating layers preferably made of a synthetic foam form the pads 11 and 12.

The heat distributing metal plate 2 is preferably aluminum as mentioned. The foil heater 4 is preferably constructed with the heating elements secured to a substrate of polyimide film such as Capton®. The heat producing resistors 34, 35 are made of a copper-nickel alloy or copper-manganese alloy, for example Cupron® or Maganine® in the form of foil heating elements secured to the substrate. In a preferred embodiment of the invention the heater elements have a linear temperature coefficient and are dimensioned to provide localized individual heat capacities or heat discharge per surface area unit so that, as mentioned, more heat is radiated along the door opening, e.g. by the margin 16 than toward the inside of the cabin.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft floor heating panel comprising a heat resistant fiber composite core structure (1B) for providing the structural strength of an aircraft floor panel, an outer first section (1A) including an electrical heater (4) and a heat distributing metal plate (2) forming a walk-on surface, a first adhesive bonding layer (3) between said electrical heater (4) and said heat distributing metal plate (2), a second adhesive bond (5) between said electrical heater (4) and said fiber composite core structure (1B), an outer second section (1C) including a heat insulating layer (11, 12) bonded to said fiber composite core structure (1B) opposite said outer first section (1A) so that said fiber composite core structure is sandwiched between said outer first and second sections, cut-out means in said composite core structure below said heat distributing metal plate, a temperature sensor (31) embedded in said cut-out means in heat sensing contact with said heat distributing metal plate, said temperature sensor being electrically connected to a control and power supply unit (29) in said aircraft for switching a power supply on and off to maintain normal operating temperatures, and fire hazard protection means electrically connected in series with said electrical heater for interrupting an electrical power supply to said electrical heater thereby overriding any control by said temperature sensor in response to temperatures exceeding said normal operating temperatures.

2. The aircraft floor heating panel of claim 1, wherein said fire hazard preventing means comprise a first thermostatic switch (32) embedded in said cut-out means and responsive to a first cut-off temperature, a second thermostatic switch (33) embedded in said cut-out means and responsive to a second cut-off temperature higher than said first cut-off temperature, and an electrical circuit connecting said electrical heater (4, 34, 35), said first thermostatic switch (32) and said second thermostatic switch (33) in series with each other and to said control and power supply unit (29).

3. The aircraft floor heating panel of claim 2, wherein said cut-out means comprise a plurality of cut-outs including a separate first cut-out (25) for said temperature sensor (31) in said fiber composite core structure (1B), a separate second cut-out (23) for said first thermostatic switch (32) in said fiber composite core structure (1B), a separate third cut-out (24) for said second thermostatic switch (33) in said fiber composite core structure, and a potting material (38) embedding each of said first and second electrostatic switches and said temperature sensor in its respective separate cut-out (23, 24, 25) in heat sensing contact with said heat distributing metal plate.

4. The aircraft floor heating panel of claim 3, comprising an aircraft door facing first panel edge (18) and a second panel edge (19) opposite said door facing first panel edge, and wherein said separate cut-outs (23, 24, 25) are positioned in said fiber composite core structure (1B) closer to said second panel edge (19) than to said door facing first panel edge (18).

5. The aircraft floor heating panel of claim 2, further comprising a heat generating resistor (37) connected in parallel to said second thermostatic switch (33), said heat generating resistor (37) being positioned in heat transfer proximity to said second thermostatic switch (33) for heating said second thermostatic switch (33) for testing or in an emergency to keep the second thermostatic switch open, a separate power supply conductor (36) for connecting said heat generating resistor (37) to a separate power supply (PS) for energizing said heat generating resistor (37) to keep said second thermostatic switch (33) open even if a temperature of said floor heating panel has dropped below said second higher cut-off temperature, and wherein said second thermostatic switch (33) can be closed again if said power supply is switched off and if a temperature of said floor heating panel has dropped below said second higher cut-off temperature.

6. The aircraft floor heating panel of claim 2, wherein said second thermostatic switch comprises an excess heater current responsive resettable cut-out for cutting off a power supply to said foil heater in response to an excess heater current such as a short-circuit current in said electrical heater (4).

7. The aircraft floor heating panel of claim 2, wherein said second thermostatic switch (33) opens said electrical circuit when said first thermostatic switch (32) failed to open said electrical circuit and said second higher cut-off temperature is reached.

8. The aircraft floor heating panel of claim 1, wherein said heat resistant fiber composite core structure (1B) comprises a heat resistant lightweight core (6) including a first core surface and a second core surface, a first carbon fiber composite layer (7) bonded to said first core surface, a second carbon fiber composite layer (8) bonded to said second core surface, a first glass fiber composite layer (9) bonded to said first carbon fiber composite layer (7) opposite said first core surface, and a second glass fiber composite layer (10) bonded to said second carbon fiber composite layer (8) opposite said second core surface.

9. The aircraft floor heating panel of claim 8, wherein at least one of said first and second carbon fiber composite layers (7, 8) and said heat distributing metal plate (11) are connected to ground potential for dissipating electrostatic charges and for avoiding arc tracking.

10. The aircraft floor heating panel of claim 1, wherein said heat resistant fiber composite core structure (1B) and said outer first section (1A) have congruent first a real configurations and wherein said outer second section (1C) including said heat insulating layer (11, 12) has a second a real configuration smaller than said congruent first areal configurations, a downwardly facing margin (13, 14, 15, 16, 17) free of heat insulation, said downwardly facing margin being formed by said first areal configurations around said heat insulating layer for mounting said floor heating panel to floor joists (J) and stringers (S) of a floor support grid structure (GS), whereby said heat insulating layer is received in spaces of the floor support grid structure and said downwardly facing margin free of heat insulation rests on said floor support grid structure.

11. The aircraft floor heating panel of claim 10, wherein said downwardly facing margin free of heat insulation comprises reinforcements passing through said fiber composite lightweight core and holes passing through said heat distributing metal plate and through said reinforcements for passing mounting screws through said holes.

12. The aircraft floor heating panel of claim 11, wherein said reinforcements are made of fiber glass composite material surrounding said holes.

13. The aircraft floor heating panel of claim 10, wherein said heat insulating layer (11, 12) of said second outer section (1C) comprises spaced pads forming gaps for receiving an aircraft floor structure component when said floor heating panel is installed as part of a floor in an aircraft.

14. The aircraft floor heating panel of claim 10, wherein said electrical heater (4) has a first heater portion congruent with said heat insulating layer and a second heater portion congruent with said margin free of heat insulation, and wherein said first heater portion has a heat output per surface area unit smaller than a heat output per surface area unit of said second heater portion congruent with said margin free of heat insulation.

15. The aircraft floor heating panel of claim 1, wherein said electrical heater is a foil heater having at least two heater portions (34, 35), each having a different heat output per surface area unit.

16. The aircraft floor heating panel of claim 1, comprising an aircraft door facing first panel edge and a second panel edge opposite said door facing panel edge, and wherein said electrical heater has a heat output per surface area unit that increases from said second panel edge toward said first panel edge facing said aircraft door.

17. The aircraft floor heating panel of claim 1, wherein said electrical heater (4) comprises foil heater portions made of at least one of a copper nickel alloy and a copper manganese alloy, said heater further including a substrate of polyimide film supporting said foil heater portions.

18. The aircraft floor heating panel of claim 1, wherein said heat distributing metal plate (11) is made of aluminum.

19. The aircraft floor heating panel of claim 1, wherein said heat insulating layer (11, 12) is adhesively bonded to said second glass fiber composite layer (10) opposite said second carbon fiber composite layer (8).

20. The aircraft floor heating panel of claim 1, wherein said outer first section (1A) comprises a first adhesive bonding film between said heater (4) and said heat distributing metal plate, and a second adhesive bonding film between said heater (4) and said heat resistant fiber composite core structure (1B).

21. The aircraft floor heating panel of claim 1, wherein said fiber composite core structure is initially composed of carbon fiber prepregs and glass fiber prepregs which have been assembled and cured in a vacuum under heat exposure in an autoclave.

22. The aircraft floor heating panel of claim 21, wherein air inclusions have been eliminated from said fiber composite core structure in said autoclave, except for unavoidable air inclusions.

23. The aircraft floor heating panel of claim 1, further comprising an electrically insulating layer between said heat distributing metal plate (2) and said electrical heater (4).

24. The aircraft floor heating panel of claim 23, wherein said first adhesive bonding layer (3) forms said electrically insulating layer between said heat distributing metal plate (2) and said electrical heater.

25. An aircraft comprising a fuselage, at least one door in said fuselage, a floor support grid structure in said fuselage, at least one floor heating panel secured to said floor support grid structure next to said at least one door, an electrical heater in said floor heating panel, a heat distributing metal plate forming a step-on surface as an integral part of said floor heating panel opposite said floor support structure, at least one temperature sensor in said floor heating panel positioned in a location away from said door for sensing a maximum panel operating temperature, a power supply circuit controlled by said at least one temperature sensor in response to a maximum panel operating temperature control signal generated by said at least one temperature sensor for switching power to said electrical heater on and off for maintaining a normal operating temperature, fire hazard protection means electrically connected in series with said electrical heater for interrupting an electrical power supply to said electrical heater, thereby overriding any control by said at least one temperature sensor, in response to temperatures exceeding said normal operating temperature and wherein said electrical heater comprises at least a first heater resistance and a second heater resistance (34, 35) having first and second heat outputs, said first heat output being higher than said second heat output thereby forming at least one high heat output zone and at least one lower heat output zone compared to said at least one high heat output zone in said at least one floor heating panel.

26. The aircraft of claim 25, wherein said at least one temperature sensor is a first thermostatic switch, and wherein said fire hazard protection means further comprise an independent monitoring circuit (36) including a second thermostatic switch (33) that responds to a second temperature higher than said maximum panel operating temperature.

27. The aircraft of claim 26, further comprising a heat generating resistor (37) connected to said monitoring circuit

(36) and in parallel to said second thermostatic switch (33) for heating said second thermostatic switch (33) to keep said second thermostatic switch (33) open after it has opened in response to said second higher temperature.

28. The aircraft of claim 25, wherein said fire hazard protection means comprises a first and a second thermostatic switch connected in series with each other in said power supply circuit, said at least one temperature sensor and said first and second thermostatic switches being positioned in heat sensing contact with said heat distribution metal plate away from said door, said at least one temperature sensor responding to said maximum panel operating temperature, said first thermostatic switch responding to a first temperature higher than said maximum panel operating temperature, said second thermostatic switch responding to a second temperature higher than said first higher temperature, whereby a triple protection against fire hazards is provided.

29. The aircraft of claim 25, wherein said floor heating panel has an areal configuration corresponding to shapes formed by said floor support grid structure.

30. The aircraft of claim 29, wherein said areal configuration is rectangular or substantially triangular.

31. The aircraft of claim 25, wherein said at least one temperature sensor (31) is located in said at least one lower heat output zone.

32. The aircraft of claim 25, wherein said at least one floor heating panel comprises at least one panel section without heat insulating and at least one panel section with heat insulation (11, 12), wherein said at least one high heat output zone is congruent with said at least one panel section without heat insulation, and wherein said at least one lower heat output zone is congruent with said at least one panel section with heat insulation.

33. The aircraft of claim 32, wherein said at least one panel section without heat insulation rests on a member of said floor support grid structure, and wherein said at least one panel section with heat insulation extends between members of said floor support grid structure.

34. The aircraft of claim 25, wherein said at least one high heat output zone is a margin (13, 14, 15, 16) of said at least one floor heating panel and wherein said at least one lower heat output zone is surrounded by said margin.

35. The aircraft of claim 25, wherein said at least one high heat output zone (17) extends between portions of said at least one low heat output zone.

36. The aircraft of claim 25, wherein said at least one high heat output zone (16) extends along a margin of said at least one floor heating panel, said margin (16) extending along said at least one door (DO).

* * * * *

UNITED STATES PATENT AND TRADEMARK OFFICE
CERTIFICATE OF CORRECTION

PATENT NO. : 6,611,659 B2 Page 1 of 1
DATED : August 26, 2003
INVENTOR(S) : Meisiek It is certified that error appears in the above-identified patent and that said Letters Patent is hereby corrected as shown below:

Column 4,
Line 14, after "circuit is", replace "Controlled" by -- controlled --;
Line 16, after "at least", replace "One" by -- one --;

Column 6,
Line 5, after "surface or", replace "a real" by -- areal --;

Column 7,
Line 49, after "have an", replace "a real" by -- areal --;

Column 9,
Line 13, after "temperature", insert -- , --;

Column 11,
Line 9, after "rectangular", replace "a real" by -- areal --;
Line 10, after "triangular", replace "a real" by -- areal --;

Column 13,
Line 23, after "congruent first", replace "a real" by -- areal --;
Lines 25 and 26, after "second", replace "a real" by -- areal --.

Signed and Sealed this

Twenty-eighth Day of October, 2003

JAMES E. ROGAN
*Director of the United States Patent and Trademark Office*